(No Model.)
W. L. FRISBIE.
CURRYCOMB.
No. 539,425. Patented May 21, 1895.
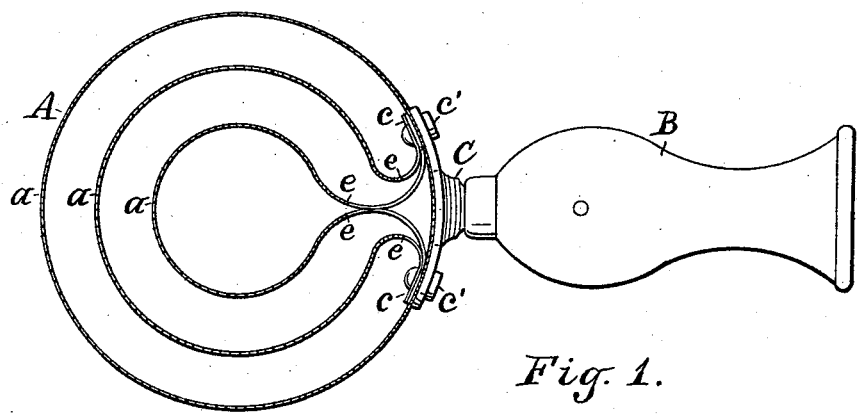
Fig. 1.
Fig. 2.
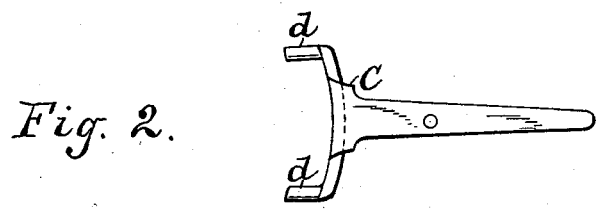
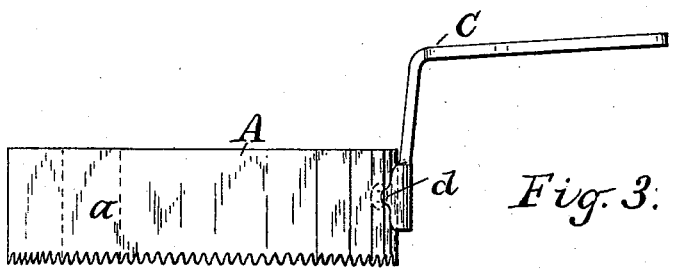
Fig. 3.
Witnesses:
Mark W. Dewey
R. S. Dewey.
Inventor,
William L. Frisbie
By C. H. Duell
his Attorney.

UNITED STATES PATENT OFFICE.

WILLIAM L. FRISBIE, OF SYRACUSE, NEW YORK, ASSIGNOR TO THE SYRACUSE SPECIALTY MANUFACTURING COMPANY, OF NEW YORK.

CURRYCOMB.

SPECIFICATION forming part of Letters Patent No. 539,425, dated May 21, 1895.

Application filed November 3, 1894. Serial No. 527,835. (No model.)

*To all whom it may concern:*

Be it known that I, WILLIAM L. FRISBIE, of Syracuse, in the county of Onondaga, in the State of New York, have invented new and useful Improvements in Currycombs, of which the following, taken in connection with the accompanying drawings, is a full, clear, and exact description.

My invention relates to curry-combs and the object is to provide a simple, flexible and convenient tool of this class.

My invention consists essentially in the combination in a curry-comb, of a series of loops formed of strap metal, serrated on one edge, and placed within and concentric with each other, a handle, and a shank connecting the handle with the said loops; and my invention consists in certain other combinations of parts hereinafter described and specifically set forth in the claim.

In the drawings, Figure 1 is a bottom plan view of a currycomb embodying my invention. Fig. 2 is a top plan view of a form of shank which may be used to connect the comb with the handle, and Fig. 3 is a side view of my improved comb with the shank attached and the handle removed.

Referring specifically to the drawings, A represents the comb. B represents the handle and C is the shank which connects the comb with the handle. The handle may be mounted on or secured to the shank in any suitable and well known manner not necessary to be described herein.

The comb proper is composed of a series of rings or loops, $a, a, a$ of strap metal placed one within the other and preferably concentric with each other. The ends of the larger ring or loop are joined or connected together by the shank, C, as hereinafter described. The ends of each of the inner loops are bent or curved outward, as shown clearly in Fig. 1, so that all the ends of the loops on each side of the comb are brought together and united in separate groups, $c, c$ to the said shank C. The shank after passing from the handle is bent downward as usual to form the thumb rest and then projects segmentally outward on each side to join or unite the two groups of ends together. The shank, C, may be connected to these groups of ends by means of rivets, $c', c'$, passing through the shank and ends, or the shank itself may be bent or formed with suitable projections, $d, d$, in place of the rivets, to enter and pass through the groups of ends, and the ends of these projections upset or headed to hold the said ends securely in place and to the shank.

The strips, $a, a, a$, are serrated on one edge only, as shown in the drawings. Preferably, I do not extend the serrations to the ends of the strips, $a, a, a$, but make the ends plain where they come together and as high as the serrations. The places where the serrations end on the strips are clearly indicated at $e$, $e, e$, &c., in Fig. 1.

Having described my invention, what I claim as new, and desire to secure by Letters Patent, is—

As a new article of manufacture, a spring curry comb consisting of a serrated outer endless band, a series of serrated independent bands, arranged concentrically within the outer band and having their respective ends turned outwardly, and a handle provided with a shank having curved wings or ears, riveted with the outer inclosing band and the outwardly turned ends of the independent bands, by means of a rivet on each side.

In testimony whereof I have hereunto signed my name.

WILLIAM L. FRISBIE. [L. S.]

Witnesses:
 MARK W. DEWEY,
 H. M. SEAMANS.